(12) United States Patent
Shull (10) Patent No.: US 8,292,041 B1
(45) Date of Patent: Oct. 23, 2012

(54) FRICTION BRAKE

(76) Inventor: Gerald L. Shull, Minden, LA (US)

( * ) Notice: Subject to any disclaimer, the term of this patent is extended or adjusted under 35 U.S.C. 154(b) by 701 days.

(21) Appl. No.: 12/456,283

(22) Filed: Jun. 15, 2009

(51) Int. Cl.
  *A01G 23/00* (2006.01)
  *B65H 59/14* (2006.01)
(52) U.S. Cl. ....... 188/65.4; 188/65.2; 144/4.1; 144/343; 414/787; 224/521; 224/519
(58) Field of Classification Search .......... 188/65.1, 188/65.2, 65.4, 65.5; 144/343, 24.13, 4.1; 254/389, 222; 403/167–168; 414/787; 224/521, 224/519
See application file for complete search history.

(56) References Cited

U.S. PATENT DOCUMENTS

| | | | |
|---|---|---|---|
| 316,870 A * | 4/1885 | Braunfeld | 188/65.4 |
| 4,027,748 A | 6/1977 | Persson | 188/65.4 |
| 4,239,188 A | 12/1980 | Hobbs | 254/376 |
| 4,314,693 A | 2/1982 | Hobbs | 254/376 |
| 5,295,559 A | 3/1994 | Nutkins | 188/65.4 |
| 5,484,253 A | 1/1996 | Johnson | 414/787 |
| 5,593,139 A | 1/1997 | Julian | 254/325 |
| 5,971,363 A * | 10/1999 | Good | 254/323 |
| 6,578,823 B1 * | 6/2003 | Johnson | 254/334 |
| 7,007,927 B2 | 3/2006 | Halas | 254/225 |
| 7,556,068 B1 * | 7/2009 | Johnson | 144/4.1 |
| 2002/0141817 A1 * | 10/2002 | Handke | 403/384 |
| 2004/0178397 A1 * | 9/2004 | Halas | 254/389 |

* cited by examiner

*Primary Examiner* — Robert A Siconolfi
*Assistant Examiner* — Anna Momper
(74) *Attorney, Agent, or Firm* — R. Keith Harrison (57) ABSTRACT

A friction brake which is suitable for applying friction to one or more load-bearing ropes in the implementation of arbor rigging or other procedures in some embodiments includes a tree engaging frame, a frame attachment mechanism carried by the tree engaging frame, a shaft receptacle carried by the tree engaging frame, an assembly mount shaft releasably inserted in the shaft receptacle and a rope engaging frame carried by the assembly mount shaft.

19 Claims, 5 Drawing Sheets

FRICTION BRAKE

FIELD

The present disclosure relates to devices for handling loads in arbor rigging procedures. More particularly, the present disclosure relates to a friction brake which is suitable for applying friction to one or more load-bearing ropes in the implementation of arbor rigging or other procedures.

BACKGROUND

Arborists frequently encounter the need to sever tree limbs from trees under circumstances in which the limbs are diseased or damaged, for example. A rope may be used to lower the limb to the ground after it is severed. A first end of the rope may be tied to the limb which is to be severed and trained over one or more overhead limbs. The remaining portion of the rope may be wrapped around the trunk of the tree one or multiple times. A second end of the rope may be gripped by the arborist. Accordingly, as the severed tree limb is lowered to the ground, the trunk and overhead limbs of the tree apply friction to the rope to slow or control the rate of descent of the severed limb and prevent the limb from crashing to the ground.

One of the drawbacks of conventional methods of lowering a severed tree limb to the ground is that of applying an appropriate magnitude of friction to the rope for the limb lowering procedure. Furthermore, proper positioning of the rope for it to be trained over the overhead limbs may be difficult.

Therefore, a friction brake which is versatile and is capable of applying friction of various magnitudes to one or multiple load-handling ropes is needed.

SUMMARY

The present disclosure is generally directed to a friction brake which is suitable for applying friction to one or more load-bearing ropes in the implementation of arbor rigging or other procedures. In some embodiments, the friction brake may include a tree engaging frame, a frame attachment mechanism carried by the tree engaging frame, a shaft receptacle carried by the tree engaging frame, an assembly mount shaft releasably inserted in the shaft receptacle and a rope engaging frame carried by the assembly mount shaft.

In some embodiments, the friction brake may include a tree engaging frame disposed in a first plane; a frame attachment mechanism carried by the tree engaging frame; and a rope engaging assembly having a rope engaging frame with a plurality of frame members carried by the tree engaging frame and disposed in a common second plane. The common second plane may be oriented in parallel, spaced-apart relationship with respect to the first plane of the tree engaging frame.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
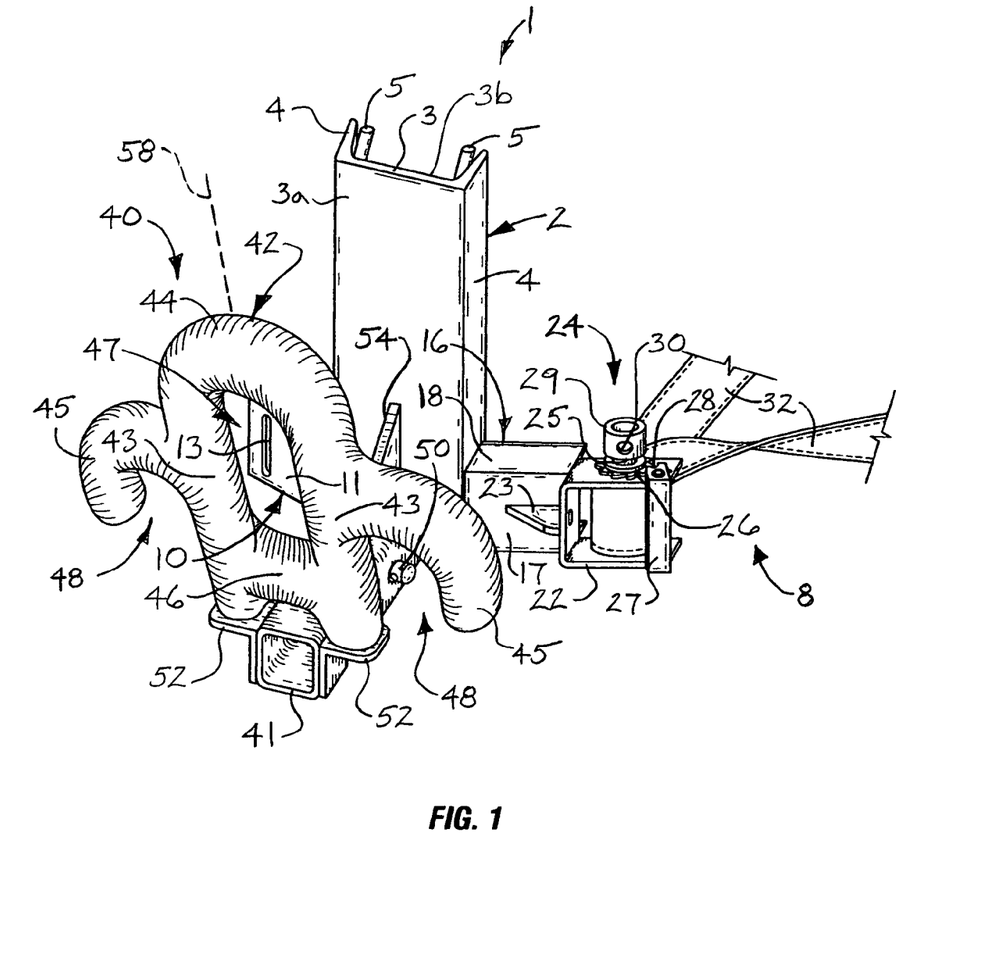
FIG. 1 is a front perspective view, partially in section, of an illustrative embodiment of the friction brake.
Figure 5:
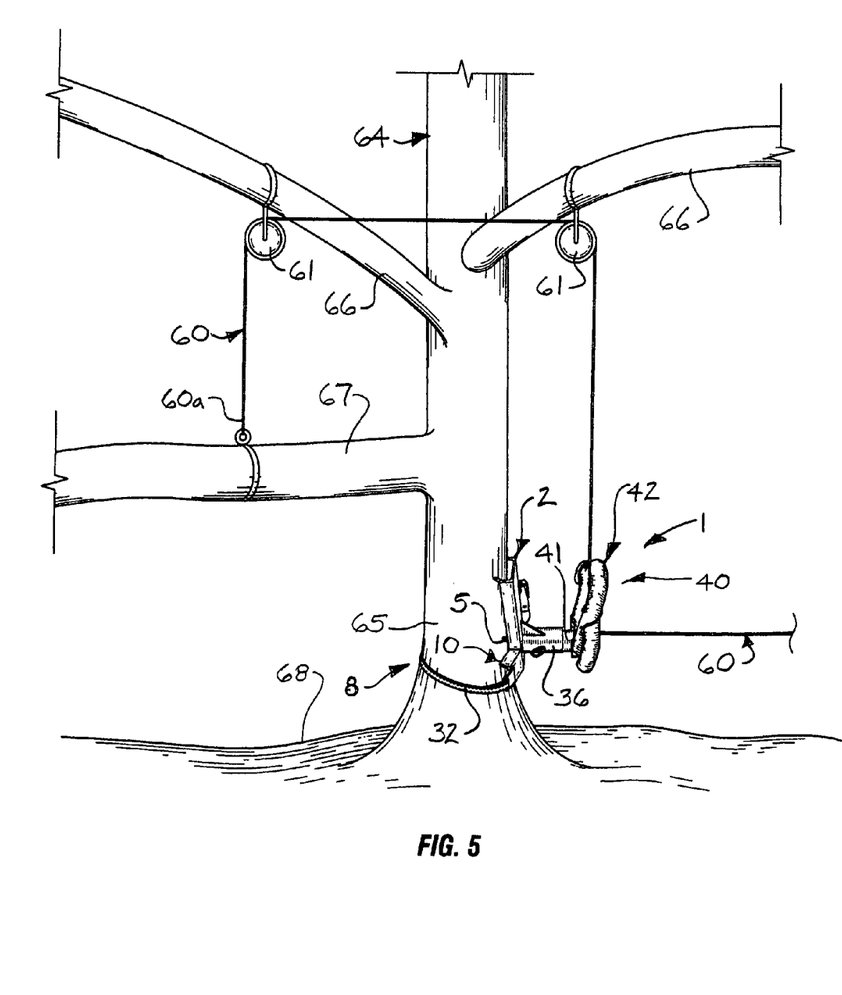
FIG. 5 is a side view of an illustrative embodiment of the friction brake, attached to a tree (partially in section) and more particularly illustrating a rope extending through and engaging the rope engaging frame of the rope engaging assembly, trained around pulleys provided on overhead tree limbs and attached to a tree limb which is to be cut.
Figure 6:
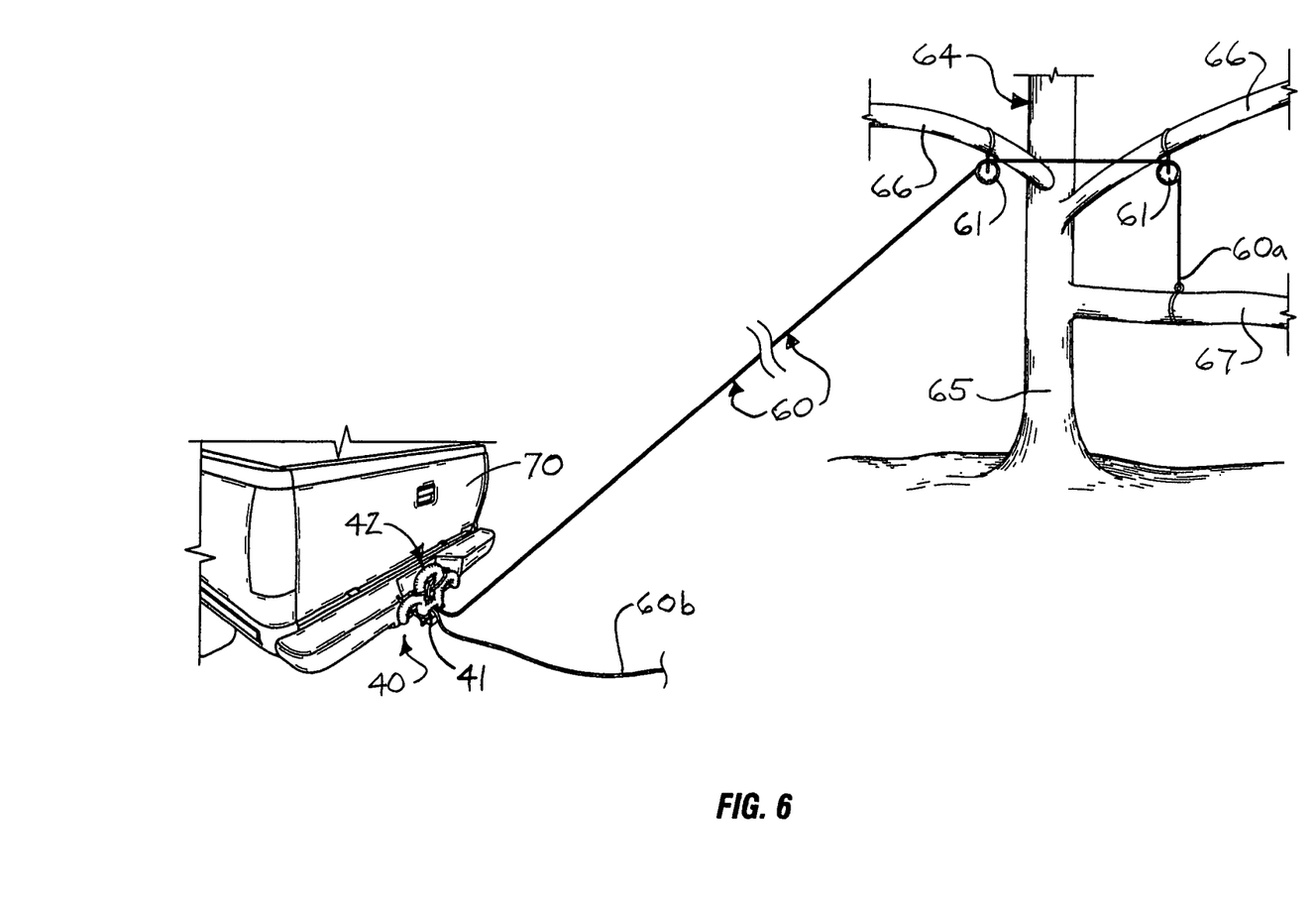
FIG. 6 is a perspective view of the rope engaging assembly of an illustrative embodiment of the friction brake, inserted in a receiver hitch (not illustrated) provided on a vehicle (in section) in an alternative application.

Referring to the drawings, an illustrative embodiment of the friction brake is generally indicated by reference numeral 1. As illustrated in FIG. 1, the friction brake 1 includes a tree engaging frame 2 and a rope engaging assembly 40 which is provided on the tree engaging frame 2. As illustrated in FIG. 5 and will be hereinafter described, the tree engaging frame 2 of the friction brake 1 is suitable for attachment to a tree 64 and the rope engaging assembly 40 is adapted to apply a selected magnitude of friction to a rope 60 during an arbor rigging procedure. For example, in some applications the rope engaging assembly 40 may apply friction to a rope 60 to which a tree limb 67 is attached to facilitate gradual lowering or controlled descent of the tree limb 67 to the ground 68 beneath the tree 64 after the tree limb 67 is severed from the tree 64. As illustrated in FIG. 6, in some embodiments, the rope engaging assembly 40 of the friction brake 1 may be detached from the tree-engaging frame 2 and attached to a hitch receiver (not illustrated) provided on a vehicle 70 to apply friction to the rope 60 during arbor rigging or other procedures. The friction brake 1 may be amenable to a variety of other applications which will be apparent to those skilled in the art.

Figure 2:
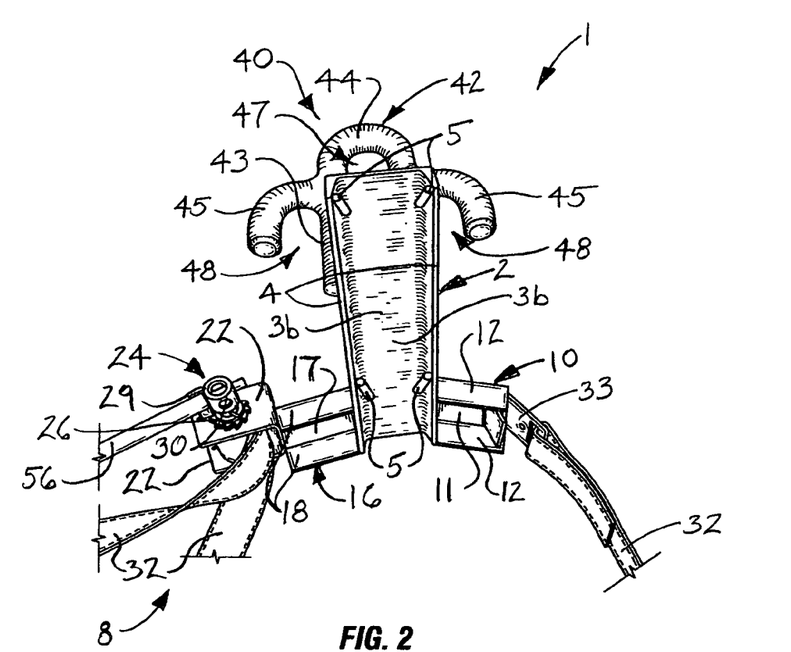
FIG. 2 is a rear perspective view, partially in section, of an illustrative embodiment of the friction brake.
Figure 3:
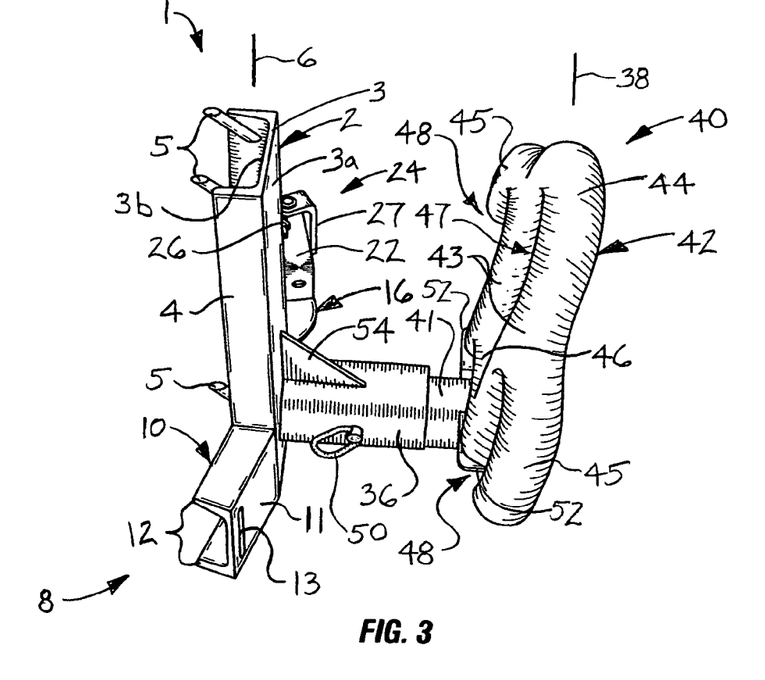
FIG. 3 is a side perspective view of an illustrative embodiment of the friction brake.

As illustrated in FIGS. 1-3, in some embodiments, the tree-engaging frame 2 of the friction brake 1 may have a generally elongated, rectangular engaging frame plate 3. The engaging frame plate 3 may have a front surface 3a and a rear surface 3b. A pair of generally parallel and spaced-apart engaging frame flanges 4 may extend from respective edges of the engaging frame plate 3 beyond the rear surface 3b. Multiple tree-engaging members 5 may extend from the rear surface 3b of the engaging frame plate 3 between the reinforcing flanges 4. As illustrated in FIG. 3, the tree-engaging frame 2 may lie within a tree-engaging frame plane 6.

A frame attachment mechanism 8 may be provided on the tree-engaging frame 2 to facilitate attachment of the tree-engaging frame 2 to the tree 64 (FIG. 5). In some embodiments, the frame attachment mechanism 8 may include a strap 32. The frame attachment mechanism 8 may further include a ratchet mechanism 24 which facilitates selective tightening of the strap 32 against the tree 64 and loosening of the strap 32. A strap attachment frame 10 may be provided on the tree-engaging frame 2. In some embodiments, the strap attachment frame 10 may include a pair of spaced-apart attachment frame flanges 12 which extend from an engaging frame flange 4 of the tree-engaging frame 2. An attachment frame plate 11 may extend between the attachment frame flanges 12.

The strap 32 may be adapted for removable attachment to the strap attachment frame 10 according to any suitable technique which is known by those skilled in the art. As illustrated in FIG. 2, in some embodiments a strap clip 33 may be provided on the strap 32. As illustrated in FIG. 3, a generally elongated strap slot 13 may be provided in the main plate 11 of the strap attachment frame 10 to receive the strap clip 33 and detachably secure the strap 32 to the strap attachment frame 10.

A ratchet support frame 16 may be provided on the tree-engaging frame 2. In some embodiments, the ratchet support frame 16 may include a pair of spaced-apart support frame flanges 18 which extend from the engaging frame flange 4 that is opposite the engaging frame flange 4 to which the strap attachment frame 10 is attached. A support frame plate 17 may extend between the support frame flanges 18.

The ratchet mechanism 24 of the frame attachment mechanism 8 may be provided on the ratchet support frame 16. In some embodiments, the ratchet mechanism 24 may include a generally C-shaped ratchet bracket 22 provided on the ratchet support frame 16. A ratchet spool 25 (FIG. 1) may span the interior of the ratchet bracket 22 and protrude from a spool opening (not illustrated) provided in the ratchet bracket 22. A toothed ratchet gear 26 may be provided on the ratchet spool 25 outside the ratchet bracket 22. A ratchet release bracket 27 having a bracket notch 28 (FIG. 1) may be pivotally attached to the ratchet bracket 22. A spool tightening collar 29 having a shaft opening 30 may be provided on the protruding end portion of the ratchet spool 25. The strap 32 may be wound on the ratchet spool 25. Accordingly, when the strap clip 33 (FIG. 2) is inserted in the strap slot 13 (FIG. 3), the strap 32 can be selectively tightened or loosened by inserting a ratchet shaft 56 (FIGS. 2 and 4) into the shaft opening 30 of the spool tightening collar 29 and winding or unwinding the strap 32 on the ratchet spool 25 by rotating the spool tightening collar 29 in the clockwise or counterclockwise direction using the ratchet shaft 56.

Figure 4:
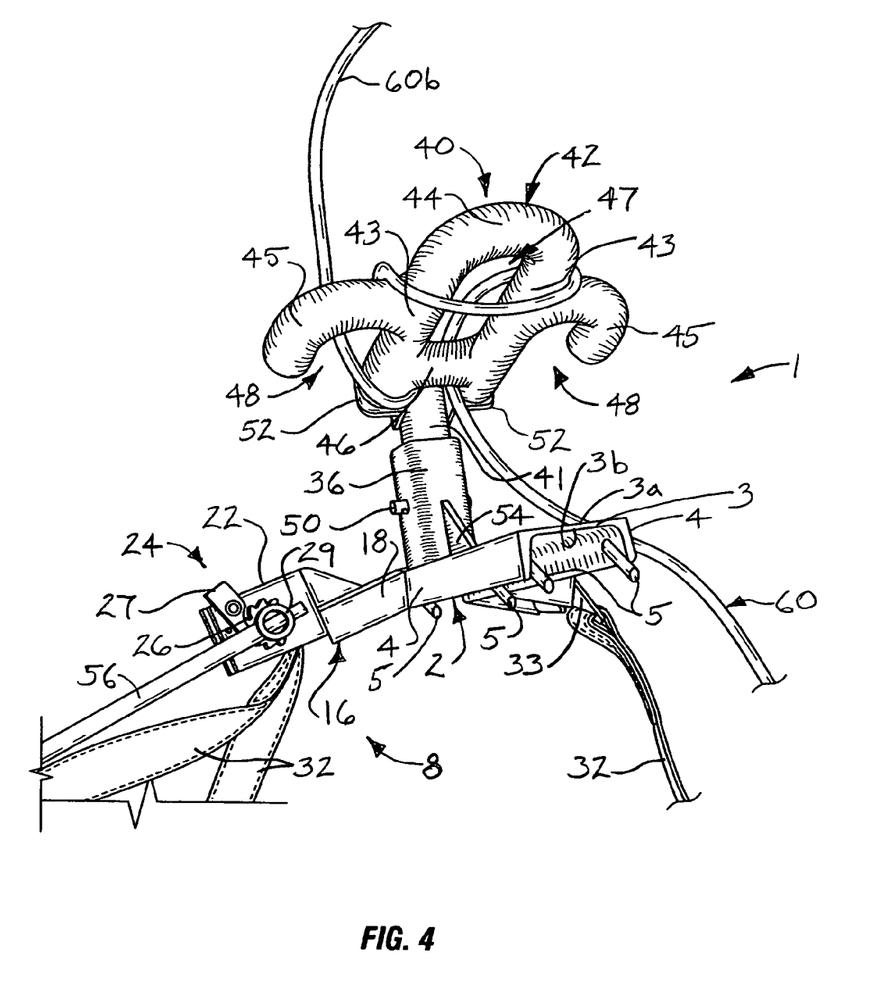
FIG. 4 is a top perspective view of an illustrative embodiment of the friction brake, with a rope (partially in section) wrapped around a rope engaging frame of a rope engaging assembly of an illustrative embodiment of the friction brake.

The rope engaging assembly 40 of the friction brake 1 may include a rope engaging frame 42 which may be attached to the tree engaging frame 2 according to any suitable technique which is known by those skilled in the art. In some embodiments, the rope engaging frame 42 may be fixedly attached to the tree engaging frame 2 via welding and/or other attachment techniques known by those skilled in the art. In other embodiments, the rope engaging frame 42 may be detachable from the tree engaging frame 2 according to the knowledge of those skilled in the art. As illustrated in FIGS. 3 and 4, in some embodiments, the rope engaging frame 42 may be attached to an assembly mount shaft 41 such as via a pair of frame mount brackets 52. In some embodiments, the rope engaging frame 42 may be pivotally attached to the assembly mount shaft 41 such as via the frame mount brackets 52. A shaft receptacle 36 may extend from the tree-engaging frame 2 such as from the front surface 3a of the engaging frame plate 3 of the tree-engaging frame 2, for example and without limitation. The shaft receptacle 36 may be reinforced by a gusset 54. The shaft receptacle 36 may be elongated with a generally square cross-section and may be the size and shape of a conventional vehicle hitch receiver (not illustrated). Accordingly, the assembly mount shaft 41 of the rope engaging assembly 40 may be inserted into the shaft receptacle 36. A shaft retainer pin 50 may be extended through registering pin openings (not illustrated) provided in the shaft receptacle 36 and the assembly mount shaft 41, respectively, to retain the assembly mount shaft 41 of the rope engaging assembly 40 in the shaft receptacle 36. In some embodiments, multiple spaced-apart pin openings (not illustrated) may be provided in at least one of the shaft receptacle 36 and the assembly mount shaft 41 to facilitate securing of the rope engaging frame 42 at selected spacings with respect to the tree-engaging frame 2.

As illustrated in FIG. 1, the rope engaging frame 42 of the rope engaging assembly 40 may include a pair of generally elongated, parallel, spaced-apart main frame members 43 which extend from the respective frame mount brackets 52 on the assembly mount shaft 41. A generally curved top connecting frame member 44 and a bottom connecting frame member 46 may extend between the main frame members 43 in spaced-apart relationship to each other. A central frame opening 47 may be defined by and between the main frame members 43, the top frame member 44 and the bottom frame member 46. In some embodiments, a curved side frame member 45 may extend outwardly from each main frame member 43 of the rope engaging frame 42. A side frame space 48 may be defined by and between each side frame member 45 and the corresponding main frame member 43 to which the side frame member 45 is attached. Each element of the rope engaging frame 42 may have a generally circular cross-section. As illustrated in FIG. 3, the main frame members 43, the top connecting frame member 44, the bottom connecting frame member 46 and the side frame members 45 may lie within a common rope engaging frame plane 38. As further illustrated in FIG. 3, the rope engaging frame plane 38 may be disposed in generally parallel relationship with respect to the tree engaging frame plane 6.

As illustrated in FIG. 1, an imaginary plane of symmetry 58 (illustrated in phantom) may divide the rope engaging frame 42 into substantially equal halves. Accordingly, each main frame member 43 and side frame member 45, as well as half of the top connecting frame member 44 and half of the bottom connecting frame member 46 of the rope engaging frame 42, may be on a corresponding side of the plane of symmetry 58.

As illustrated in FIGS. 4 and 5, in typical application the friction brake 1 is used to apply a selected magnitude of friction to a load-bearing rope 60 during the implementation of various arbor rigging procedures. For example and without limitation, in some applications, the friction brake 1 may apply friction to the rope 60 in the gradual lowering of a tree limb 67 which is attached to the rope 60 to the ground 68 beneath the tree 64 after the tree limb 67 is severed from the tree 64. Accordingly, the friction brake 1 is initially attached to the tree trunk 65 of the tree 64 typically by initially placing the tree-engaging members 5 (FIG. 2) of the tree engaging frame 2 against the tree 64. The strap 32 of the frame attachment mechanism 8 is extended around the tree 64 and the strap clip 33 (FIG. 2) provided on the end of the strap 32 is inserted through the strap slot 13 (FIG. 3) provided in the attachment frame plate 11 of the strap attachment frame 10 to attach the strap 33 to the strap attachment frame 10. The strap 32 may be tightened around the tree 64 by inserting the ratchet shaft 56 (FIGS. 2 and 4) through the shaft opening 30 in the spool tightening collar 29 of the ratchet mechanism 24 and rotating the ratchet shaft 56 typically in the counterclockwise direction illustrated in FIG. 4, thereby winding the strap 32 on the ratchet spool 25 of the ratchet mechanism 24. The rope engaging frame 42 of the rope engaging assembly 40 is disposed in generally parallel, spaced-apart relationship with respect to the tree-engaging frame 2.

As illustrated in FIG. 5, a first end 60a of the rope 60 may be tied around the limb 67 which is to be severed and trained over one or multiple overhead limbs 66 which extend from the tree 64 above the limb 67 which is to be severed. In some applications, a pulley 61 may be tied to each overhead limb 66 and the rope 60 may be trained over the pulley or pulleys 61. In other applications, the rope 60 may be extended directly over the overhead limb or limbs 66. The rope 60 is then extended or wrapped around one or more elements of the rope engaging frame 42 of the rope engaging assembly 40 to apply a magnitude of friction to the rope 60 which is necessary to facilitate gradual lowering of the tree limb 67 which is to be severed to the ground 68 after the tree limb 67 is severed from the tree 64.

Depending on the magnitude of friction which is required for application to the rope 60 to enable a controlled descent of the severed tree limb 67 to the ground 68 after it is severed from the tree 64, the rope 60 is extended at least once around at least one of the main frame members 43, the top connecting frame member 44, the side frame members 45 and the bottom connecting frame member 46 of the rope engaging frame 42. Therefore, the surface area of contact between the rope 60 and the rope engaging frame 42 and therefore, the magnitude of friction which the rope engaging frame 42 exerts against the rope 60, can be varied by wrapping the rope 60 around one or multiple elements of the rope engaging frame 42 one or multiple times. The magnitude of friction which is to be applied to the rope 60 depends typically on the size and weight of the tree limb 67 which is to be severed, with a larger and heavier tree limb 67 requiring a correspondingly larger magnitude of friction and a smaller and lighter tree limb 67 requiring a correspondingly smaller magnitude of friction which must be applied to the rope 60 to facilitate a controlled descent of the severed tree limb 67 to the ground 68. In the example which is illustrated in FIG. 5, the rope 60 is initially extended through the central frame opening 47 of the rope engaging frame 42 and then over the upper surface of one of the side frame members 45 and through the side frame space 48 beneath the same side frame member 45. In the example which is illustrated in FIG. 4, the rope 60 is initially extended forwardly through the side frame space 48 beneath one of the side frame members 45 and then rearwardly beneath the bottom connecting frame member 46 and upwardly over the respective side frame members 45 and around the main frame members 43. Therefore, the arrangement or configuration which is illustrated in FIG. 4 exerts a larger magnitude of friction against the rope 60 than the arrangement or configuration which is illustrated in FIG. 5 since the total surface area of contact between the rope 60 and the rope engaging frame 42 is greater in the example illustrated in FIG. 4 than the example illustrated in FIG. 5. After the rope 60 is wrapped around one or multiple elements of the rope engaging frame 42, a second end portion 60b of the rope 60 extends rearwardly from the friction brake 1, as illustrated in FIG. 4.

As an arborist (not illustrated) grips the second end portion 60b of the rope 60, the tree limb 67 is cut and severed from the free 64. Accordingly, the weight of the tree limb 67 pulls the rope 60 through the pulley or pulleys 61 attached to the overhead limb or limbs 66 and against the respective element or elements of the rope engaging frame 42 around which the rope 60 is wound or extended. The friction which the rope engaging frame 42 imparts against the rope 60 as the rope 60 is displaced under the weight of the falling tree limb 67 slows the descent of the tree limb 67 until it reaches the ground 68. The arborist may additionally control the descent of the tree limb 67 by pulling on the second end portion 60b of the rope 60.

After the severed tree limb 67 reaches the ground 68, the rope 60 may then be untied or detached from the severed tree limb 67 and the friction brake 1 may be used in like manner in the removal of additional tree limbs 67 from the tree 64. After use of the friction brake 1, the rope 60 may be removed from the pulley or pulleys 61 and unwound and disengaged from the rope engaging frame 42 of the rope engaging assembly 40 of the friction brake 1. The friction brake 1 may be detached from the tree 64 by loosening the strap 32 of the frame attachment mechanism 8 by operation of the ratchet mechanism 24 (FIG. 4), as was heretofore described, and removing the strap clip 33 (FIG. 2) from the strap slot 13 (FIG. 3) provided in the attachment frame plate 11 of the strap attachment frame 10.

As illustrated in FIG. 6, in some applications of the friction brake 1 the rope engaging assembly 40 may be detached from the tree engaging frame 2 and attached to a conventional hitch receiver (not illustrated) provided on a vehicle 70. The rope engaging assembly 40 may be detached from the tree engaging frame 2 by removing the shaft retainer pin 50 (FIG. 3) from the registering pin openings (not illustrated) provided in the assembly mount shaft 41 and the shaft receptacle 36 and removing the assembly mount shaft 41 from the shaft receptacle 36. The rope engaging assembly 40 may then be attached to the vehicle 70 by inserting the assembly mount shaft 41 into the hitch receiver (not illustrated) provided on the vehicle 70. The shaft retainer pin 50 (FIG. 3) may be inserted through registering pin openings (not illustrated) provided in the vehicle hitch receiver and the assembly mount shaft 41 to retain the assembly mount shaft 41 in the hitch receiver. Use of the rope engaging assembly 40 may be as is illustrated in FIG. 6 and as was heretofore described with respect to FIG. 5. Application of the rope engaging assembly 40 while attached to the vehicle 70, as illustrated in FIG. 6, may be necessary under circumstances in which access to the tree trunk 65 of the tree 64 from which the tree limb 66 is severed may be hindered by thick vegetation, flower beds or the like.

It will be appreciated by those skilled in the art that the shape and elements of the rope engaging frame 42 facilitates application of friction of selected magnitudes to a load-bearing rope 60 during arbor rigging or other procedures. By wrapping the rope 60 around one or more of the main frame members 43, the top connecting frame member 44, the bottom connecting frame member 46 and/or the side frame members 45, a selected magnitude of friction can be applied to the rope 60 to facilitate controlled descent of a severed tree limb 67 to the ground 68 as was heretofore described with respect to FIG. 5. Moreover, it will be appreciated by those skilled in the art that the typically symmetrical configuration of the rope engaging frame 42 on respective sides of the plane of symmetry 58 (FIG. 1) facilitates extension of the rope 60 to the friction brake 1 from a tree limb 67 which is located at virtually any position to the left or right of the friction brake 1. This expedient enhances versatility of the friction brake 1 in controlling the descent of severed tree limbs 67 from virtually any location in the tree 64.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A friction brake comprising:
   an elongated tree engaging frame having a first frame end and a second frame end;
   a frame attachment mechanism carried by said tree engaging frame generally at said first frame end;
   an elongated shaft receptacle carried by said tree engaging frame at said first frame end;
   an elongated assembly mount shaft having a first shaft end releasably inserted in said shaft receptacle and a second shaft end spaced-apart from said first shaft end; and
   a rope engaging assembly having an elongated rope engaging frame pivotable towards or away from said tree engaging frame and carried by said assembly mount shaft at said second shaft end.

2. The friction brake of claim 1 wherein said rope engaging frame comprises a pair of generally elongated, parallel, spaced-apart main frame members carried by said assembly mount shaft.

3. The friction brake of claim 2 wherein said rope engaging frame further comprises a first connecting frame member and a second connecting frame member connecting said main frame members.

4. The friction brake of claim 3 wherein said rope engaging frame further comprises a pair of side frame members carried by said main frame members, respectively.

5. The friction brake of claim 4 wherein each of said pair of side frame members is curved and wherein said rope engaging frame further comprises a side frame space between each of said pair of side frame members and a corresponding one of said main frame members.

6. The friction brake of claim 5 wherein said main frame members, said first connecting frame member, said second connecting frame member and said pair of side frame members of said rope engaging frame are disposed in a common plane.

7. The friction brake of claim 6 wherein said common plane of said rope engaging frame is disposed in generally parallel relationship with respect to a plane of said tree-engaging frame.

8. The friction brake of claim 1 wherein said tree-engaging frame comprises an engaging frame plate, a pair of spaced-apart engaging frame flanges extending from said engaging frame plate and a plurality of free-engaging members extending from said engaging frame plate between said engaging frame flanges.

9. A friction brake comprising:
   a tree engaging frame having an elongated engaging frame plate disposed in a first plane and a pair of elongated, parallel, spaced-apart engaging frame flanges extending from said engaging frame plate, said tree engaging frame having a first frame end and a second frame end;
   a frame attachment mechanism carried by said tree engaging frame at said first frame end;
   an elongated square tubing shaft receptacle carried by said engaging frame plate of said tree engaging frame at said first frame end;
   an elongated square tubing assembly mount shaft having a first shaft end inserted in said shaft receptacle and a second shaft end spaced-apart from said first shaft end;
   a rope engaging assembly having an elongated rope engaging frame with a plurality of frame members pivotally carried by said assembly mount shaft at said second shaft end and disposed in a common second plane, said rope engaging frame having a longitudinal axis normally disposed parallel to said longitudinal axis of said engaging frame plate of said tree engaging frame; and
   wherein said common second plane is oriented in parallel, spaced-apart relationship with respect to said first plane of said tree engaging frame.

10. The friction brake of claim 9 wherein said rope engaging frame of said rope engaging assembly is symmetrical.

11. The friction brake of claim 9 wherein said plurality of frame members of said rope engaging frame comprises a pair of generally elongated, parallel, spaced-apart main frame members; first and second connecting frame members connecting said main frame members in spaced-apart relationship with respect to each other; a central frame opening defined by and between said main frame members, said first connecting frame member and said second connecting frame member; a pair of curved side frame members carried by said main frame members, respectively; and a pair of side frame spaces defined by and between said main frame members and said side frame members, respectively.

12. The friction brake of claim 9 wherein said frame attachment mechanism comprises a strap attachment frame having a strap slot carried by said tree engaging frame, a ratchet support frame carried by said tree engaging frame, a ratchet mechanism carried by said ratchet support frame and a strap engaged by said ratchet mechanism and engaging said strap slot in said strap attachment frame.

13. The friction brake of claim 9 wherein said tree engaging frame comprises a generally elongated, rectangular engaging frame plate; a pair of spaced-apart engaging frame flanges extending from said engaging frame plate; and a plurality of tree engaging members extending from said engaging frame plate between said engaging frame flanges.

14. The friction brake of claim 9 wherein said rope engaging frame is releasable with respect to said tree-engaging frame.

15. A friction brake comprising:
   a tree engaging frame having an elongated engaging frame plate disposed in a first plane and a pair of elongated, parallel, spaced-apart engaging frame flanges extending from said engaging frame plate, said tree engaging frame having a first frame end and a second frame end;
   a strap attachment frame having a strap slot extending outwardly from a first one of said frame flanges at said second frame end;
   a ratchet support frame extending outwardly from a second one of said frame flanges at said second frame end;
   a frame attachment mechanism having a ratchet bracket carried by said ratchet support frame, a ratchet mechanism carried by said ratchet bracket, a strap engaged by said ratchet mechanism and a strap clip carried by said strap and engaging said strap slot of said strap attachment frame;
   an elongated square tubing shaft receptacle carried by said engaging frame plate of said tree engaging frame at said second frame end between said strap attachment frame and said ratchet support frame;
   an elongated square tubing assembly mount shaft having a first shaft end releasably inserted in said shaft receptacle and a second shaft end opposite said first shaft end;
   a rope engaging assembly having an elongated rope engaging frame comprising:
     a pair of generally elongated, parallel, spaced-apart main frame members pivotally carried by said assembly mount shaft at said second shaft end;

first and second connecting frame members connecting said main frame members in spaced-apart relationship with respect to each other;

a central frame opening defined by and between said main frame members, said first connecting frame member and said second connecting frame member;

a pair of curved side frame members carried by said main frame members, respectively; and a pair of side frame spaces defined by and between said main frame members and said side frame members, respectively;

wherein said main frame members, said connecting frame members and said curved side frame members are disposed in a common second plane; and wherein said common second plane is oriented in parallel, spaced-apart relationship with respect to said first plane of said tree engaging frame and a longitudinal axis of said rope engaging frame is normally parallel to a longitudinal axis of said engaging frame plate of said tree engaging frame.

16. The friction brake of claim 15 wherein said rope engaging frame of said rope engaging assembly is symmetrical.

17. The friction brake of claim 15 further comprising a plurality of tree-engaging members extending from said engaging frame plate between said engaging frame flanges.

18. The friction brake of claim 15 further comprising a pair of frame mount brackets carried by said assembly mount shaft and wherein said main frame members of said rope engaging frame are carried by said frame mount brackets, respectively.

19. The friction brake of claim 18 wherein said frame mount brackets are pivotally carried by said assembly mount shaft.

* * * * *